United States Patent
Peterson et al.

(12)

(10) Patent No.: US 6,675,720 B2
(45) Date of Patent: Jan. 13, 2004

(54) MANAGEMENT SYSTEM FOR MULTIPLE CABLES

(75) Inventors: Martha G. Peterson, McKinney, TX (US); Brent A. Boudreaux, Highland Village, TX (US); Patrick Wesley Clark, McKinney, TX (US); Scott Stuart Smith, Richardson, TX (US); Michael Jay Zalta, Richardson, TX (US); Lee Thomas Van Laren, Garland, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/944,642

(22) Filed: Aug. 31, 2001

(65) Prior Publication Data

US 2003/0042096 A1 Mar. 6, 2003

(51) Int. Cl.[7] .............................................. B61B 12/10
(52) U.S. Cl. ...................................................... 104/196
(58) Field of Search ......................... 191/12 R, 12.2 R, 191/12.4; 242/615, 615.2, 615.4; 104/183, 196

(56) References Cited

U.S. PATENT DOCUMENTS

| | | | | |
|---|---|---|---|---|
| 3,700,833 A | * | 10/1972 | Behme | 137/615 |
| 4,425,071 A | * | 1/1984 | Dunbar | 191/12 R |
| 5,181,591 A | * | 1/1993 | Zona et al. | 191/12 R |
| 6,070,742 A | * | 6/2000 | McAnally et al. | 211/26 |
| 6,086,013 A | * | 7/2000 | Looney et al. | 242/594.4 |

\* cited by examiner

*Primary Examiner*—S. Joseph Morano
*Assistant Examiner*—Robert J. McCarry, Jr.

(57) ABSTRACT

A cable management system includes an opposed pair of articulated A-frame support assemblies that are connected by a cable support platform, such as a roller. The A-frame support assemblies may be reach between an electrical system chassis and an equipment rack in a manner that permits the elevation of the cable support platform to change concomitant with extensile and de-extensile motion of the electrical system chassis relative to the equipment rack. This change in elevation manages slack in the cable to feed cable forwardly during extensile motion of the electrical system chassis and to pull cable rearwardly with de-extensile motion.

19 Claims, 5 Drawing Sheets

MANAGEMENT SYSTEM FOR MULTIPLE CABLES

BACKGROUND OF THE INVENTION

1. Field of the Invention

The invention pertains to the field of cable management systems that are used to prevent tangling and resultant damage to electrical and optical cables that are used to transmit data or power. More specifically, the cable management systems are deployed to facilitate movement of one electrical chassis relative to another body without having to disconnect the cables.

2. Discussion of the Related Art

A variety of cable management systems run horizontally, as opposed to vertically. It is increasingly the case, in rack-mounted systems, that forward and rearward extensile motion of an electrical system chassis is desired without having to disconnect the cables from the chassis. The cable management systems all generate excess slack in the cables. Some degree of cable slack is required to permit the forward and rearward chassis motion; however, a relatively large amount of slack is required in practice, which becomes subject to tangling that interferes with forward and rearward motion of the chassis in horizontally-tracked systems. For example, U.S. Pat. No. 6,233,791 uses a resilient U-clip to secure cables to static surfaces. This type of fixed system does not facilitate movement of an associated electrical system chassis. U.S. Pat. No. 6,070,742 describes a horizontally extensible tray that is used to support cables in a rack mounted system; however, full inward extension of the tray is associated with the formation of cable slack that eventually develops tangles, particularly, when many different cables are present.

U.S. Pat. No. 6,170,784 discloses a variable height cable management system having a fixed horizontal brace that may be selectively attached across two upright supports. The height of the structure does not vary with motion of the associated electrical system chassis and, consequently, cable movement over the horizontal brace subjects the cables to undue wear. Furthermore, greater lengths of cable are required to accommodate the height of the horizontal support brace.

There remains a need for an improved cable management system that is capable of managing more cables and longer lengths of cables that can be managed by prior cable management systems.

SUMMARY OF THE INVENTION

The present invention overcomes the problems that are outlined above by providing a cable management system that facilitates forward and rearward motion of a rack-mounted electrical chassis. The cable management system uses articulated A-frame supports that vary with height depending upon the degree of forward and rearward motion. Thus, the cable management system is able to manage more cables and greater lengths of cables that can be managed by prior cable management systems.

The cable management system comprises an opposed pair of articulated A-frame support assemblies. Each of the articulated A-frame support assemblies comprises a first segment, a second segment, and a knee joint coupling the first segment with the second segment in a manner permitting the knee joint to move in elevation between a low position and a high position concomitant with arcuate pivoting motion of the first segment and the second segment. A cable support platform is coupled with the pair of the articulated A-frame supports to provide a horizontal surface for support of cables.

The first segment of each articulated A-frame support optionally comprises an extensible leg that permits a greater extent of forward movement in the electrical chassis. This extensible leg, for example, comprises a first member and a second member that is telescopically received within the first member. The leg is extensible when the knee joint is in the low position.

The cable support platform optionally comprises a roller. In this case, the cable support surface may include the roller having alternating cylindrical segments of different radial dimensions that act as cable groomers to distribute the load of cable across the support surface, which is bounded by cable retention ears at opposite ends of the support surface.

A single pin may extend through the roller and the knee joints of the articulated A-frame supports. The pin provides a pivot axis for the knee joints and a roller axis for the roller. A pair of spacer bearings may be borne on the pin to a greater width than is occupied by the articulated A-frame supports. The spacer bearings may abut structure, such as the interior of a rear compartment on the chassis, to prevent wobble in the cable support platform.

The cable management system is mounted on a support frame, such as the support frame for the electrical system chassis. A channel may be mounted to the support frame to provide clear access for cable installation and removal beneath other chassis components. This channel may also be provided with a tool retention structure for use in retaining a cable installation tool. A T-bar assembly may also be mounted to the support frame to provide a cable stress relief structure.

The articulated A-frame supports may each comprise a frame for use in securing cables to the articulated A-frame supports. For example, this frame may comprise a triangle brace proximate the knee joint of the articulated A-frame support. The triangle brace may be perforated to receive cable ties, cable retention clips, and the like.

The cable management system is used according to a method of managing cables to facilitate movement of the electrical system chassis assisted by use of the articulated A-frame support assembly. The method comprises the steps of:

(a) connecting a first end of a cable with the electrical system and a second end of the cable with a locus outside the electrical system such that the cable has sufficient slack to permit extensile and de-extensile motion of the electrical system chassis with respect to the locus;

(b) routing the cable over the articulated A-frame support assembly during the step of connecting; and (c) extending and de-extending the electrical system chassis with concomitant rising and falling of the articulated A-frame support assembly to manage the slack in the cable.

DETAILED DESCRIPTION

The following detailed description illustrates a preferred embodiment of a cable management assembly that uses articulated A-frame supports to occupy such slack in a cable as is required for extensile and de-extensile motion of an electrical system chassis that may, for example, be mounted in an electrical equipment rack. The use of a preferred example should not be construed to unduly limit the concepts that are disclosed herein because the teaching is by way of example and not by limitation.

Figure 1:
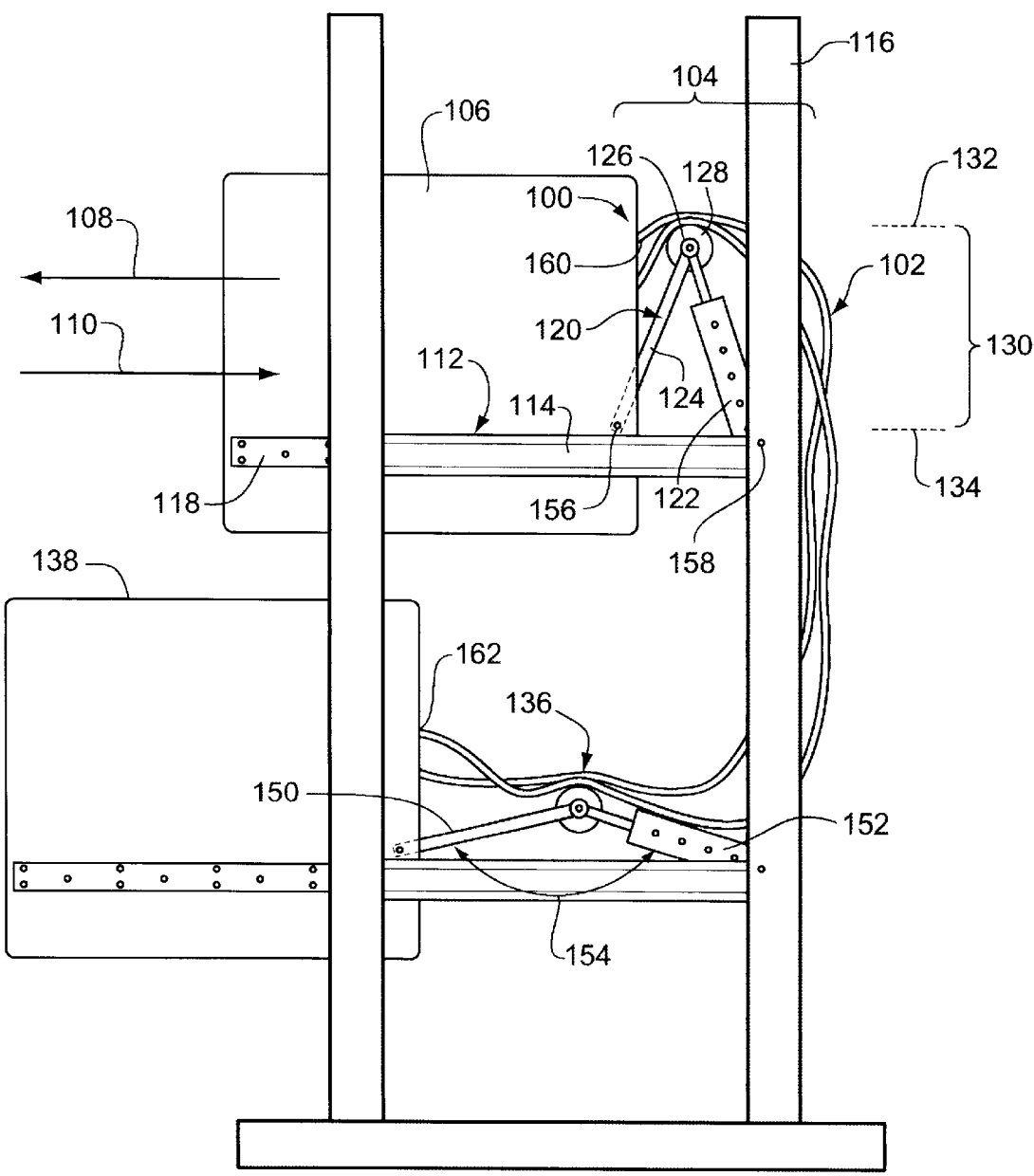
FIG. 1 depicts a right side elevational view of a rack-mounted cable management system.

FIG. 1 depicts a cable management assembly 100 that is used to manage slack residing in cable 102 over region 104. The slack in cable 102 is sufficient to permit forward and rearward motion of an electrical system chassis 106 including extensile motion according to arrow 108 and de-extensile motion according to arrow 110. A conventional telescoping rail assembly 112 includes a female rail member 114 that is bolted to an equipment rack 116, and a male slide 118 that is slidingly received within the female rail member 114 and bolted to the electrical system chassis 106. The telescoping rail assembly 112 facilitates extensile and de-extensile motion of the electrical system chassis 106 according to arrows 108 and 110.

The cable management assembly 100 comprises an opposed pair of articulated A-frame support assemblies, though only one such assembly 120 is visible from the perspective of FIG. 1. The articulated A-frame support assembly 120 comprises a first segment 122, a second segment 124, and a knee joint 126 coupling the first segment 122 with the second segment 124. A cable support platform 128 is coupled with the pair of the articulated A-frame support assemblies, such as assembly 120, to provide horizontal support for cable 102. The knee joint 126 has a vertical range of motion over an interval 130 extending between a high position 132 and a low position 134.

The rise and fall of knee joint 126 over the vertical range of motion 130 is concomitant with extensile and de-extensile motion of the electrical system chassis 106, according to arrows 108 and 110, as well as arcuate pivoting motion of the first segment 122 and the second segment 124 originating from the knee joint 126. By way of example, FIG. 1 also shows a second cable management assembly 136 that is identical to cable management assembly 100. A second chassis 138 is coupled with the second cable management assembly 136. The second chassis 138 is extended from the equipment rack 116 further than is the electrical equipment chassis 106, with a corresponding drop in knee joint 148 and associated pivotal opening of segments 150, 152 along arc 154. Fastener 158 pivotally connects electrical system chassis 106 with first segment 122 remotely from the knee joint 126. Fastener 156 similarly connects the second segment 124 with the equipment rack 116.

A first end 160 of cable 102 is connected with the electrical system chassis 106, for example, to a bus or other electrical component residing on the electrical system chassis 106. A second end 162 is connected to a locus outside the electrical system chassis 106, for example, to the second chassis 138. The rising and falling motion of cable support platform 128 between the high position 132 and the low position 134, concomitant with forward and rearward motion of electrical system chassis 106 according to arrows 108, 110, prevents tangling of cable 102 with itself and other cables and prevents resultant damage to the cables.

Figure 2:
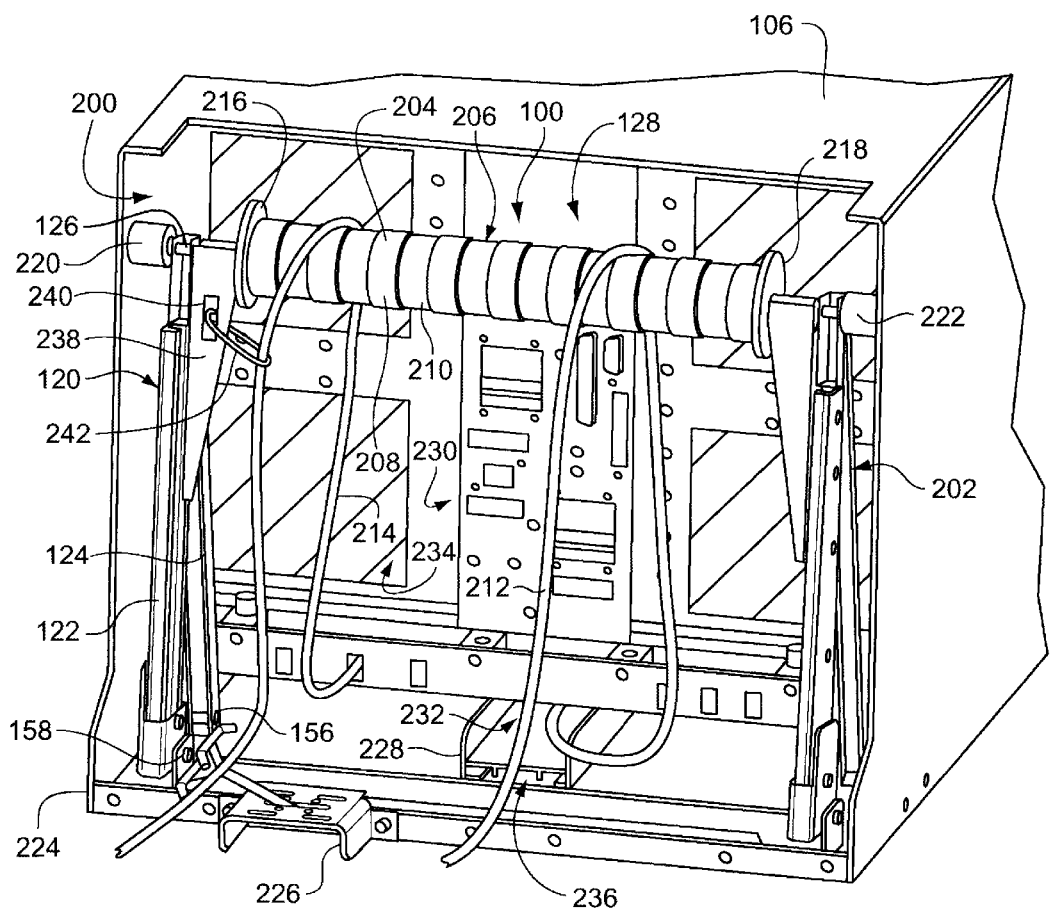
FIG. 2 depicts a top, rear, left side perspective view of the cable management system installed within an electrical system chassis.

FIG. 2 is a rear perspective view of the electrical system chassis 106 showing the cable management assembly 100 installed within a rear cavity 200. A second articulated A-frame support assembly 202 is a mirror image of the articulated A-frame support assembly 120. The cable support platform 128 extends horizontally between the articulated A-frame support assemblies 120, 202.

FIG. 2 demonstrates a particularly preferred cable support platform 128 in the form of a single-piece roller 204 presenting an outboard surface 206 formed of alternating cylindrical segments 208 and 210 each having a different radial outboard dimension. Thus, the surface 206 functions as a cable grooming surface that uses the alternating cylindrical segments 208, 210 to even out and distribute cables, such as cables 212 and 214, over the cable support surface 206. Opposed cable retention ears 216, 218 are located at opposite ends of the cable support surface 206 to retain cables 212, 214 on surface 206 as platform 128 moves through its range of motion. A pair of spacer bearings 220, 222 occupy a greater width than is occupied by the articulated A-frame support assemblies 120, 202, and prevent side-to-side wobble of the cable support assembly 100 by abutting chassis 106.

A support frame 224 forms part of chassis 106 and carries an optional T-bar assembly 226, which is used to provide cable stress relief, for example, by engaging cable 214 to reduce the strain and freedom of motion that is imposed upon cable 214 by forward and rearward motion of chassis 106. A channel 228 is mounted to the support frame 224 to provide clear access beneath wall 230 for cable installation and removal through passageway 232. The chassis 106 may include any number of additional features, such as a fan exhaust area 234. Opposed rail structure 236 beneath passageway 232 is optionally used for storage of tools, such as a conventional cable installation tool.

The articulated A-frame support assembly 120 may comprise an optional triangular brace 238 proximate the knee joint 126, which includes a perforation 240 capable of accepting a cable tie 242 for use in additionally restraining the freedom of motion in cable 214

Figure 3:
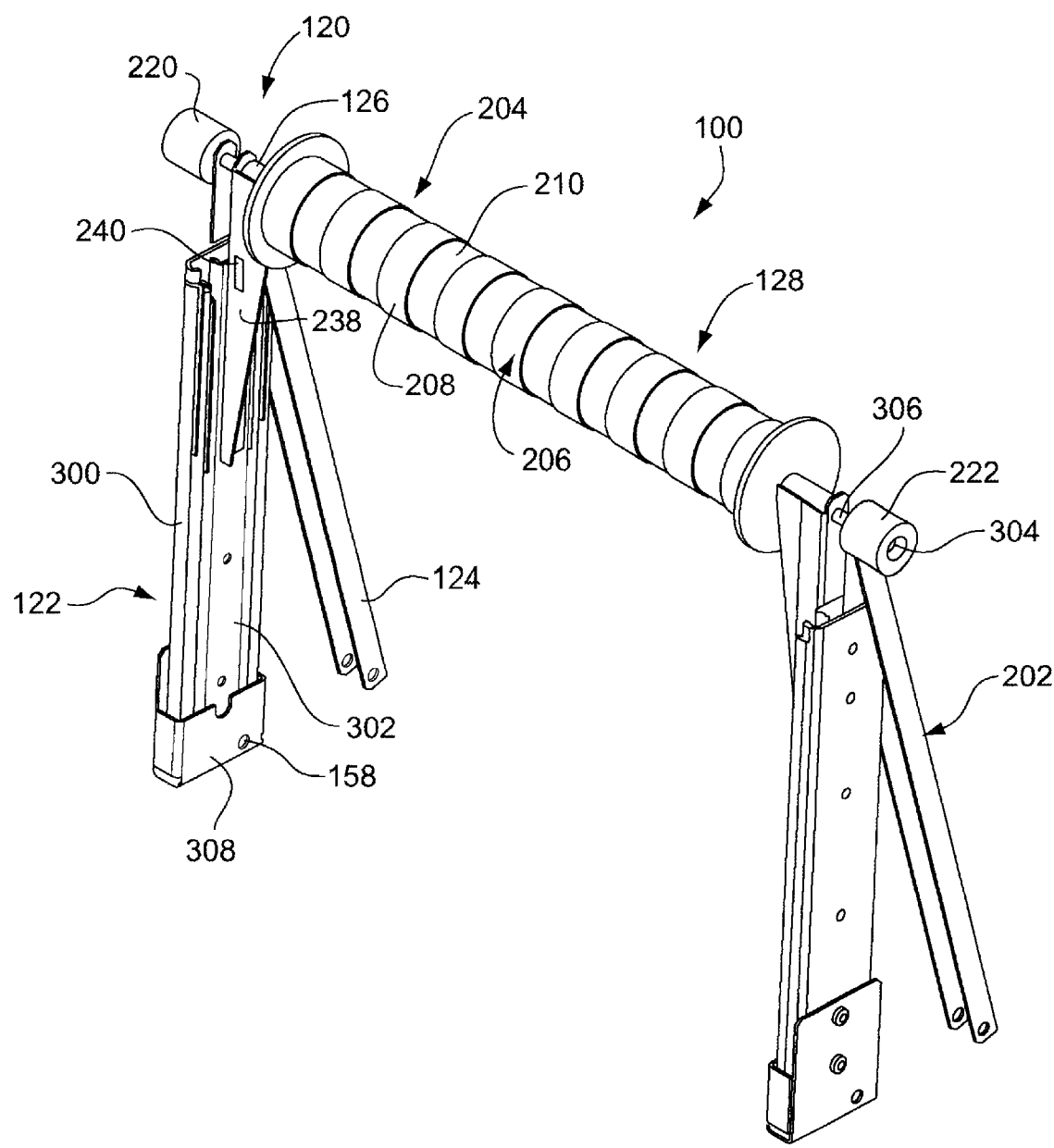
FIG. 3 depicts a perspective view of the cable management system removed from the electrical system chassis.

FIG. 3 depicts the cable support system 100 from a top, side, rear perspective that reveals the first segment 122 comprising at least two members that include an elongated female receptacle 300 holding an extensible male leg 302. The triangle brace 240 is attached to the extensible male leg 302. A single-piece pin 304 protrudes though the roller 204, the spacer bearings 220, 222, and the respective knee joints 126, 306 to form a unitary axis for pivoting of the first segment 122 and the second segment 124, as well as an axis of rotation for roller 204. A shoe 308 provides additional reinforcement for pivoting motion of first segment 122 around fastener 310.

Figure 4:
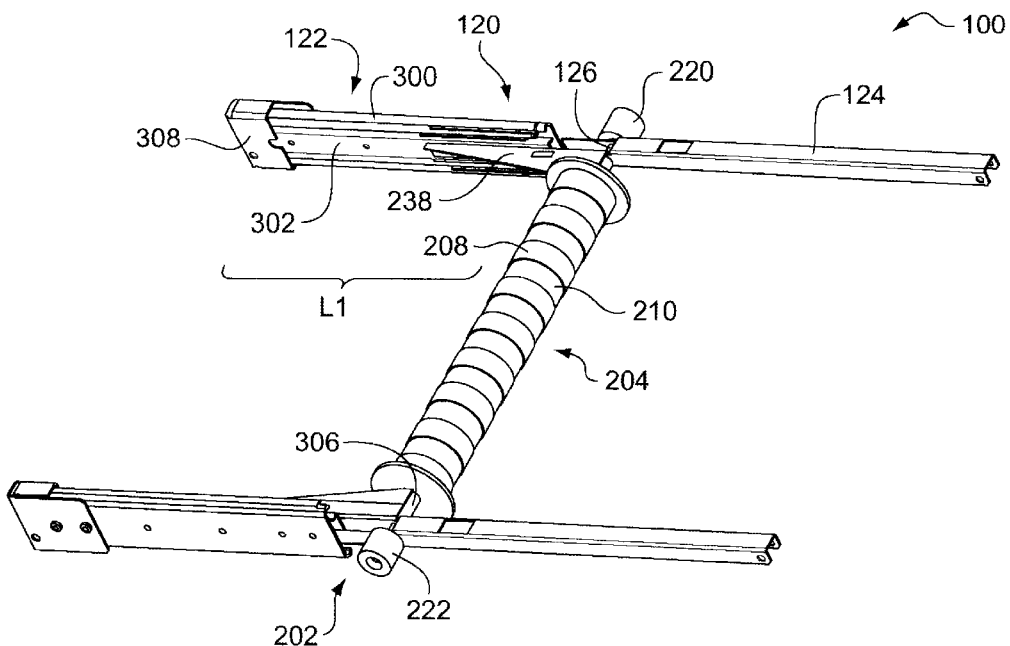
FIG. 4 is a left side elevational perspective view of the cable management system of FIG. 2 in a flattened configuration.
Figure 5:
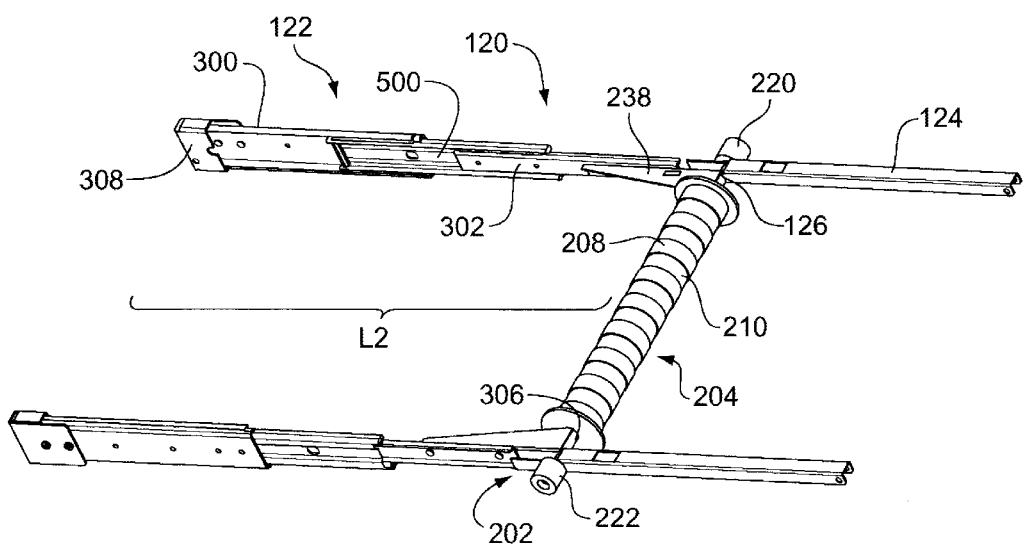
FIG. 5 is a perspective view demonstrating full extension of the cable management system from the position shown in FIG. 4.

FIG. 4 depicts the cable support assembly in a horizontally flattened configuration presenting the low height 134 for knee joint 126. At this point, the extensible male leg 302 is fully received within female receptacle 300, such that first segment 122 occupies a minimum extension length L1. FIG.

5 depicts the cable support assembly 100 in a flattened configuration with full extension of the first segment 122. An optional hermaphroditic intermediate slide 500 is provided for receiving the extensible male leg 302 and, in turn, being received within the female receptacle 300. The purpose of the hermaphroditic intermediate slide 500 is to provide a greater extension length L2 than can be obtained from the female receptacle 300 and the extensible male leg 302 alone for a given minimum extension length L2.

Figure 6:
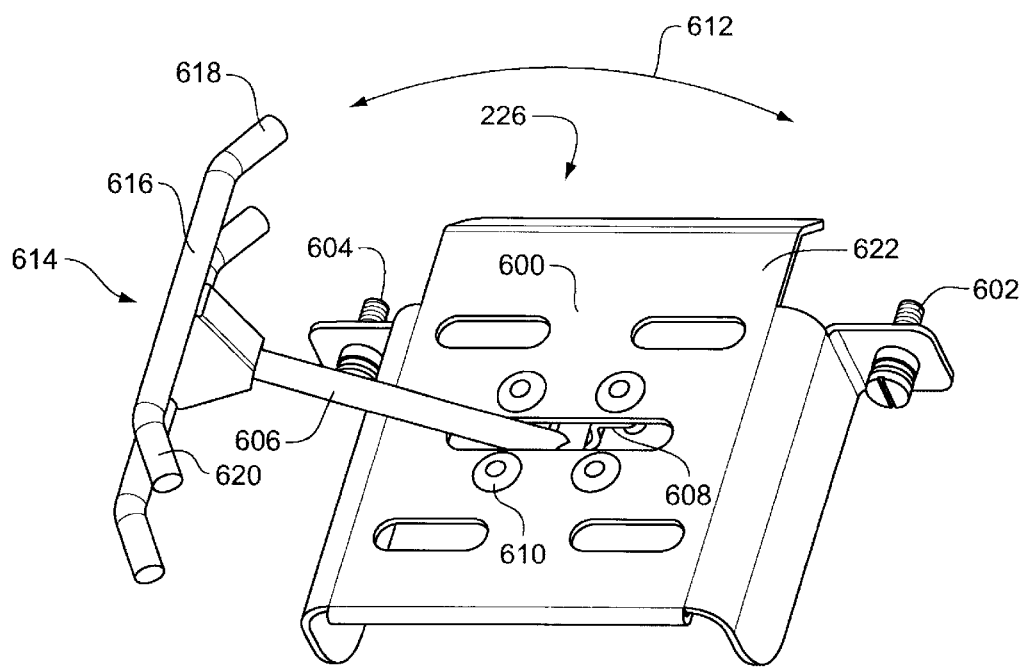
FIG. 6 is a top, left rear perspective view of a T-bar assembly that optionally forms part of the cable management systems.

FIG. 6 is a top rear perspective view providing additional detail with respect to the T-bar assembly 226. A channel bracket 600 is coupled to the support frame 224 (see FIG. 2) through bolts 602, 604. A handle arm 606 is pivotably connected to journal flange 608 through the use of threaded fasteners 610 to permit arcuate motion of handle arm 606 over the range indicated by arc 612. Handle 614 comprises a pair of bars 616 with ends 618, 620 bent inwardly towards channel bracket 600. A forward-extending lip 622 is used to provide additional support for the T-bar assembly 226 by residing atop support frame 224.

Figure 7:
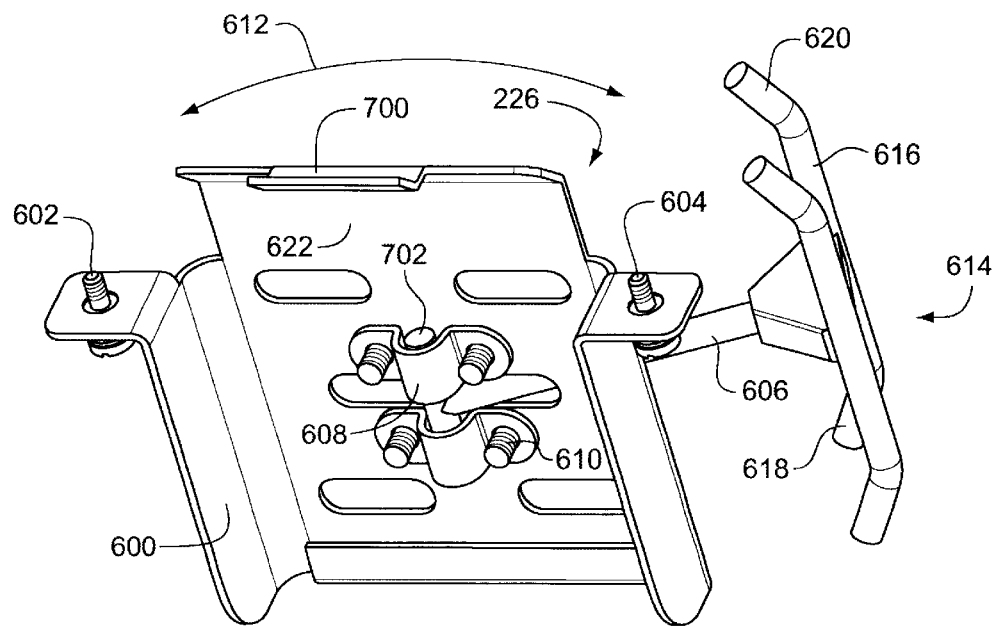
FIG. 7 is a bottom, left perspective view of the T-bar assembly.

FIG. 7 is a bottom front perspective view of the T-bar assembly 226. Lip 622 is shown to have a tongue 700 that engages complimentary mating structure in the support frame 224 (see FIG. 2). The journal flange 608 engages a T-section opposite handle 614 to permit arcuate motion of handle 614 along arc 612.

In operation, the cable management system 100 is used to manage cables by permitting forward and rearward movement of the electrical system chassis 106 with use of articulated A-frame support assemblies 120, 202. The method of use comprises connecting the first end 160 of cable 102 with the electrical system chassis 106 and connecting a second end 162 of the cable 102 with a locus, e.g., second chassis 138, that resides outside the electrical system chassis, such that the cable has sufficient slack to permit extensile and de-extensile motion 108, 110, of the electrical system chassis 106 with respect to the locus. The cable 102 is routed over the cable support platform 128 of the articulated A-frame support assembly 102, after which extending and de-extending the electrical system chassis 106 with concomitant rising and falling of the articulated A-frame support assembly between positions 132 and 134 manages and grooms in a comb-like fashion the slack in cable 102 over region 104. The cable 102 may optionally be routed through passageway 232 and through the T-bar assembly 226 to provide additional support for cable 102. Any number of cables may be used in combination with cable 102.

The foregoing discussion is intended to illustrate the concepts of the invention by way of example with emphasis upon the preferred embodiments and instrumentalities. Accordingly, the disclosed embodiments and instrumentalities are not exhaustive of all options or mannerisms for practicing the disclosed principles of the invention. The inventors hereby state their intention to rely upon the Doctrine of Equivalents in protecting the full scope and spirit of the invention.

What is claimed is:

1. A cable management system, comprising:
    an electrical equipment rack;
    a chassis for housing electrical equipment,
    the chassis having an extensible range of motion relative to the elctrical equipment rack;
    the electrical equipment rack and the chassis connected by an opposed pair of articulated A-frame supports, each of the articulated A-frame supports comprising
        a first segment,
        a second segment, and
        a knee joint coupling the first segment with the second segment in a manner permitting the knee joint to move in a vertical range of motion between a low position and a high position when the chassis moves over the extensible range of motion; and
        a cable support platform coupled with the pair of articulated A-frame supports and extending therebetween to provide a surface for support of cables.

2. The cable management system as set forth in claim 1, wherein the first segment of each articulated A-frame support comprises an extensible leg.

3. The cable management system as set forth in claim 2, wherein the extensible leg comprises a first member and a second member telescopically received within the first member.

4. The cable management system as set forth in claim 1, wherein the leg is extensible when the knee joint is in the low position.

5. The cable management system as set forth in claim 1, wherein the cable support platform comprises a roller.

6. The cable management system as set forth in claim 5, wherein the support surface comprises the roller having alternating cylindrical segments of different radial dimensions.

7. The cable management system as set forth in claim 5, wherein the roller comprises cable retention ears at opposite ends of the support surface.

8. The cable management system as set forth in claim 5, comprising a pin extending through the roller and the knee joints of the articulated A-frame supports, the pin providing a pivot axis for the knee joints and a roller axis for the roller.

9. The cable management system as set forth in claim 8, comprising a pair of spacer bearings born on the pin to a greater width than is occupied by the articulated A-frame supports.

10. The cable management system as set forth in claim 1, comprising a support frame and a channel mounted to the support frame to provide access for cable installation and removal.

11. The cable management system as set forth in claim 10, the channel comprising a tool retention structure for use in retain a cable installation tool.

12. The cable management system as set forth in claim 1, comprising a support frame and a T-bar assembly mounted to the support frame to provide a cable stress relief structure.

13. The cable management system as set forth in claim 1, wherein the articulated A-frame supports each comprise a frame for use in securing cables to the articulated A-frame supports.

14. The cable management system as set forth in claim 13, wherein the frame comprises a triangle brace proximate the knee joint of the articulated A-frame support.

15. A method of managing cables to permit movement of an electrical system chassis facilitated by use of an articulated A-frame support assembly including a cable support platform that travels over a vertical range of motion between a low position and a high position concomitant with extensile and de-extensile motion of the articulated A-frame support assembly, the method comprising the steps of:

connecting a first end of a cable with the electrical system and a second end of the cable with a locus outside the electrical system such that the cable has sufficient slack to permit extensile and de-extensile motion of the electrical system chassis with respect to the locus;

routing the cable over the articulated A-frame support assembly during the step of connecting; and extending and de-extending the electrical system chassis with concomitant rising and falling of the articulated A-frame support assembly and cable support platform to manage the slack in the cable.

16. The method according to claim 15, wherein the step of routing the cable comprises routing the cable through a clear channel.

17. The method according to claim 15, where the step of routing the cable comprises routing the cable through a T-frame to provide cable stress relief.

18. The method according to claim 15, where the step of routing the cable comprises tying the cable to the articulated A-frame support.

19. A cable slack management system for use with a chassis presenting a rear face and mounted in telescoping relationship to a rack assembly to permit an extensile and de-extensile motion of the chassis, the chassis having cables extending from the rear face, comprising:

a cable support platform associated with the rack and including structure to permit a vertical range of motion between high and low positions concomitant with the extensile and de-extensile motion of the chassis.

* * * * *